United States Patent
Birsching (10) Patent No.: US 11,235,801 B2
(45) Date of Patent: Feb. 1, 2022

(54) MAGNETIC TORQUE OVERLAY STEERING SYSTEM WITH OFF-ROAD DAMPING

(71) Applicant: Steering Solutions IP Holding Corporation, Saginaw, MI (US)

(72) Inventor: Joel E. Birsching, Vassar, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 203 days.

(21) Appl. No.: 16/531,927

(22) Filed: Aug. 5, 2019

(65) Prior Publication Data

US 2019/0351943 A1 Nov. 21, 2019

Related U.S. Application Data

(62) Division of application No. 15/215,805, filed on Jul. 21, 2016.

(60) Provisional application No. 62/195,507, filed on Jul. 22, 2015.

(51) Int. Cl.
*B60W 10/20* (2006.01)
*B62D 6/00* (2006.01)

(52) U.S. Cl.
CPC ............. *B62D 6/008* (2013.01); *B60W 10/20* (2013.01)

(58) Field of Classification Search
CPC .......... B62D 6/008; B62D 5/06; B60W 10/20
See application file for complete search history.

(56) References Cited

U.S. PATENT DOCUMENTS

| 5,072,804 A | * | 12/1991 | Bischof | B62D 6/008 180/422 |
| 5,709,281 A | * | 1/1998 | Sherwin | B62D 5/0466 180/272 |
| 6,152,254 A | * | 11/2000 | Phillips | B62D 5/0463 180/421 |

(Continued)

FOREIGN PATENT DOCUMENTS

| CN | 1944139 A | 4/2007 |
| CN | 101365616 A | 2/2009 |

(Continued)

OTHER PUBLICATIONS

"Force-Feedback System Design for the Steer-By-Wire: Optimisation and Performance Evaluation;" D. Gualino; I. J. Adounkpe; 2006 IEEE Intelligent Transportation Systems Conference (pp. 181-187); Nov. 10, 2008.*

(Continued)

*Primary Examiner* — Khoi H Tran
*Assistant Examiner* — Jorge O Peche
(74) *Attorney, Agent, or Firm* — Dickinson Wright PLLC (57) ABSTRACT

Technical solutions are described for generating a damping torque in a magnetic torque overlay (MTO) steering system. An example method includes generating a damping torque based on a vehicle speed value, a handwheel velocity value, and a differential pressure value. The method further includes detecting an off-road condition, and in response, computing an off-road damping torque signal based on one or more of the vehicle speed value, the handwheel velocity value, the differential pressure value, and a handwheel angle value. The method also includes scaling the damping torque by the off-road damping torque signal in response to detecting the off-road condition.

6 Claims, 5 Drawing Sheets

(56) References Cited

U.S. PATENT DOCUMENTS

| | | | | |
|---|---|---|---|---|
| 7,364,006 | B2* | 4/2008 | Birsching | B62D 5/0835 |
| | | | | 180/421 |
| 7,725,227 | B2* | 5/2010 | Pattok | B62D 5/0472 |
| | | | | 701/41 |
| 8,200,393 | B2* | 6/2012 | Kato | B62D 5/008 |
| | | | | 701/41 |
| 8,632,096 | B1* | 1/2014 | Quinn | B62D 7/222 |
| | | | | 280/771 |
| 9,079,608 | B2* | 7/2015 | Birsching | B62D 5/0835 |
| 9,120,500 | B2* | 9/2015 | Oblizajek | B62D 5/0472 |
| 9,221,491 | B2* | 12/2015 | Kodera | B62D 5/0472 |
| 9,308,934 | B2* | 4/2016 | Aoki | B62D 6/10 |
| 9,346,489 | B2* | 5/2016 | Dutsky | B62D 5/0835 |
| 9,359,006 | B2* | 6/2016 | Kodera | B62D 5/049 |
| 9,862,411 | B2* | 1/2018 | Birsching | B62D 5/06 |
| 10,351,167 | B2* | 7/2019 | Birsching | B62D 5/065 |
| 2006/0052201 | A1* | 3/2006 | Augustine | B62D 5/008 |
| | | | | 475/19 |
| 2007/0001629 | A1* | 1/2007 | McGarry | B61C 15/14 |
| | | | | 318/52 |
| 2007/0021889 | A1* | 1/2007 | Tsuchiya | B62D 6/008 |
| | | | | 701/41 |
| 2008/0133066 | A1* | 6/2008 | Takenaka | B60G 17/0195 |
| | | | | 701/1 |
| 2008/0290618 | A1* | 11/2008 | Yanaka | B60G 17/0195 |
| | | | | 280/6.15 |
| 2009/0012669 | A1* | 1/2009 | Takenaka | B60W 10/10 |
| | | | | 701/31.4 |
| 2009/0024281 | A1* | 1/2009 | Hwang | B62D 6/008 |
| | | | | 701/42 |
| 2009/0118905 | A1* | 5/2009 | Takenaka | B60W 40/064 |
| | | | | 701/41 |
| 2010/0222958 | A1* | 9/2010 | Kobayashi | B60W 10/06 |
| | | | | 701/31.4 |
| 2011/0010053 | A1* | 1/2011 | Champagne | B62D 5/0469 |
| | | | | 701/42 |
| 2012/0004807 | A1* | 1/2012 | Hales | B62D 5/0463 |
| | | | | 701/41 |
| 2012/0101687 | A1* | 4/2012 | Svensson | B62D 15/024 |
| | | | | 701/42 |
| 2012/0232755 | A1* | 9/2012 | Birsching | B62D 5/0472 |
| | | | | 701/41 |
| 2013/0158805 | A1* | 6/2013 | Champagne | B62D 5/0472 |
| | | | | 701/41 |
| 2013/0158880 | A1 | 6/2013 | Champagne | |
| 2014/0224565 | A1* | 8/2014 | Birsching | B62D 5/0835 |
| | | | | 180/423 |
| 2015/0088380 | A1* | 3/2015 | Gabor | B62D 5/046 |
| | | | | 701/41 |
| 2015/0120140 | A1* | 4/2015 | Kudo | B62D 6/008 |
| | | | | 701/41 |
| 2016/0031481 | A1* | 2/2016 | Birsching | B62D 5/06 |
| | | | | 701/36 |
| 2016/0280252 | A1* | 9/2016 | Tagami | B62D 5/046 |
| 2017/0021860 | A1 | 1/2017 | Birsching | |
| 2017/0166249 | A1* | 6/2017 | Birsching | B62D 5/065 |
| 2019/0225262 | A1* | 7/2019 | Polmans | B62D 5/0472 |
| 2019/0359203 | A1* | 11/2019 | Isshiki | B60W 30/025 |
| 2020/0070789 | A1* | 3/2020 | Oshida | B60W 10/22 |
| 2020/0262473 | A1* | 8/2020 | Kreis | B62D 5/001 |

FOREIGN PATENT DOCUMENTS

| | | | | |
|---|---|---|---|---|
| CN | 101860305 A | | 10/2010 | |
| DE | 102008026730 A1 | * | 12/2009 | ........... B62D 5/0466 |
| DE | 102008026730 A1 | | 12/2009 | |
| DE | 102016113454 A1 | * | 1/2017 | ............ B62D 6/008 |
| EP | 2497697 | * | 10/2012 | |
| JP | 20100132137 A | | 6/2010 | |
| WO | WO-2010089172 A1 | * | 8/2010 | ............ B62D 6/008 |
| WO | 2014128818 A1 | | 8/2014 | |

OTHER PUBLICATIONS

"A New Control Strategy of an Electric-Power-Assisted Steering System;" A. Marouf, M. Djemai, C. Sentouh, P. Pudlo ; IEEE Transactions on Vehicular Technology (vol. 61, Issue: 8, pp. 3574-3589); Dec. 14, 2012.*

* cited by examiner

MAGNETIC TORQUE OVERLAY STEERING SYSTEM WITH OFF-ROAD DAMPING

CROSS-REFERENCES TO RELATED APPLICATIONS

This is a divisional application of, and claims priority to, U.S. patent application Ser. No. 15/215,805, filed Jul. 21, 2016, which claims priority to U.S. Provisional Application No. 62/195,507, filed on Jul. 22, 2015, each of the disclosures being incorporated herein by reference in their entireties.

BACKGROUND

The present application relates to providing off-road damping for a magnetic torque overlay (MTO) steering system.

Hydraulic steering systems use a power steering pump to provide pressurized hydraulic fluid to either a recirculating ball style steering gear or rack-and-pinion style steering gear. A driver applies an amount of torque to a steering valve integrated into the steering gear, and the amount of torque applied is indicative of a level of assist. A hydraulic steering system that incorporates a magnetic actuator into the valve assembly facilitates implementing techniques on the hydraulic system, such as variable effort, leads and pulls correction, active damping, active return, and the like.

Accordingly, it is desirable to provide additional algorithms for a magnetic torque overlay in an off-road damping algorithm.

SUMMARY

According to one or more examples, a method for generating a damping torque in a magnetic torque overlay (MTO) steering system includes generating a damping torque based on a vehicle speed value, a handwheel velocity value, and a differential pressure value. The method further includes detecting an off-road condition, and in response, computing an off-road damping torque signal based on one or more of the vehicle speed value, the handwheel velocity value, the differential pressure value, and a handwheel angle value. The method also includes scaling the damping torque by the off-road damping torque signal in response to detecting the off-road condition.

According to one or more examples, a steering system that uses MTO includes an off-road damping module, which computes an off-road damping signal. The steering system further includes a torque generation module that receives the off-road damping signal from the off-road damping module. The torque generation module computes a damping torque value based on the off-road damping signal and a damping blend signal.

According to one or more examples, a torque module of a steering system, generates a damping torque based on a vehicle speed value, a handwheel velocity value, and a differential pressure value. The torque module further detects an off-road condition. In response to the off-road condition being detected, the torque module computes an off-road damping torque signal based on one or more of the vehicle speed value, the handwheel velocity value, the differential pressure value, and a handwheel angle value. The torque module further scales the damping torque using the off-road damping torque signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The technical solutions described herein facilitate providing damping to a steering system of a vehicle during an off-road condition. For example, an activation module provides an off-road damping torque signal based at least in part upon one of a vehicle speed value, a handwheel velocity value, a handwheel angle value, and a differential pressure value. An off-road damping blend module provides a damping blend signal based on the differential pressure. A product calculation module provides a damping torque value from a product of the off-road damping torque signal and the damping blend signal.

Figure 1:
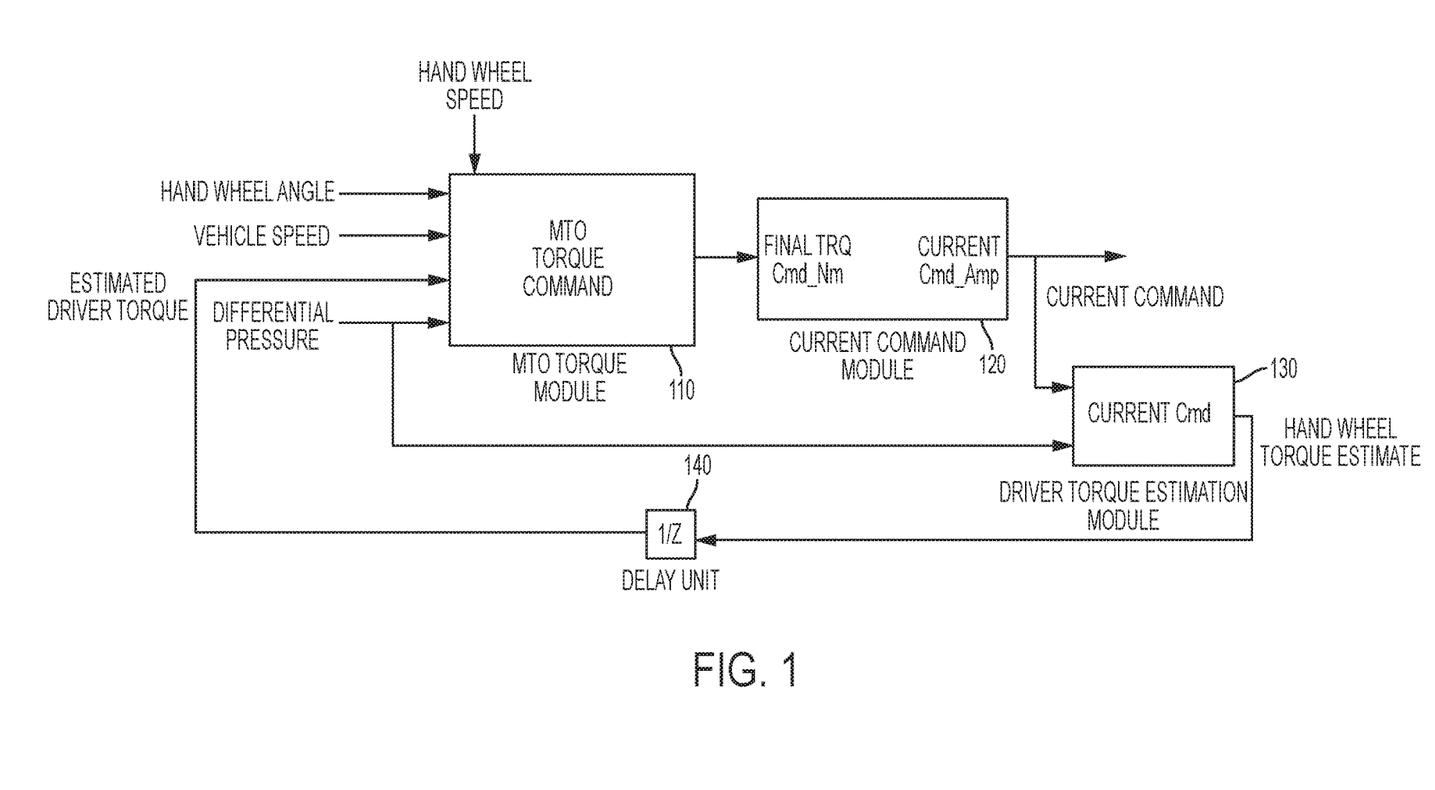
FIG. 1 shows a block diagram of example components of a magnetic torque overlay (MTO) steering system.

FIG. 1 shows a block diagram of example components of a magnetic torque overlay (MTO) steering system. It is understood that the MTO steering system has additional components, a subset of which is illustrated. The MTO steering system includes a MTO torque module 110, which receives a measurement of a differential pressure across a piston in the steering system as input. The MTO torque module 110 also receives vehicle signals, such as a vehicle speed signal, an estimation of driver torque signal, a hand wheel angle signal, a hand wheel speed (not shown) are used to generate a desired MTO torque command. The MTO torque module 110 uses the input signals to generate a MTO torque command, and sends the command to a current command module 120. The current command module 120 converts the MTO torque command into a current command. The current command is further applied to a magnetic actuator coil in the MTO steering gear. The current command module 120 also sends the current command to a driver torque estimation module 130. The driver torque estimation module 130 further receives the measured differential pressure. The driver torque estimation module 130 generates a handwheel torque estimation signal using the inputs. The driver torque estimation module 130 sends the handwheel torque estimation signal to the MTO torque module 110 via a delay unit 140. The MTO torque module 110 uses the delayed handwheel torque estimation signal for computing a next MTO torque command for the next loop.

In some situations, such as in case of trucks, drivers may take a vehicle equipped with the MTO steering system off-road. In such situations, the rougher (or more rugged) off-road terrain imparts larger forces on the MTO steering system compared to when the vehicle is being driven on smoother terrain, such as paved roads. The forces resulting from such rougher terrain produce increased torque levels, and acceleration of the steering wheel away from the center. The driver has to overcome such increased torque levels. Typically, to reduce fatigue for the driver in such conditions, the steering system incorporates shock absorbers. However, shock absorbers are expensive, and have the additional disadvantage of providing damping even when it is not needed. Thus, the conventional technical solutions of using shock absorbers (or other dampers) degrade steering performance for majority of the time during which the vehicle is operated on a smoother surface, such as roads.

The technical solutions described herein facilitate the MTO steering system to provide damping without the expense of additional shock absorber(s) or damper(s). In one or more examples, the MTO steering system receives a damping signal based on the vehicle speed. However, only using the vehicle speed to activate the damping signal may prevent the MTO steering system from differentiating a situation where the driver is actively steering away from center (such as a low speed parking situation), from a situation where the inputs from the terrain are forcing the steering wheel away from center (to which the driver counteracts). Accordingly, the technical solutions described herein, in addition to generating the damping signal, activate the generation of the damping signal based on additional parameters. Thus, the technical solutions described herein detects an unintended input from the terrain and provide a corresponding damping signal to facilitate reducing driver fatigue.

Figure 2:
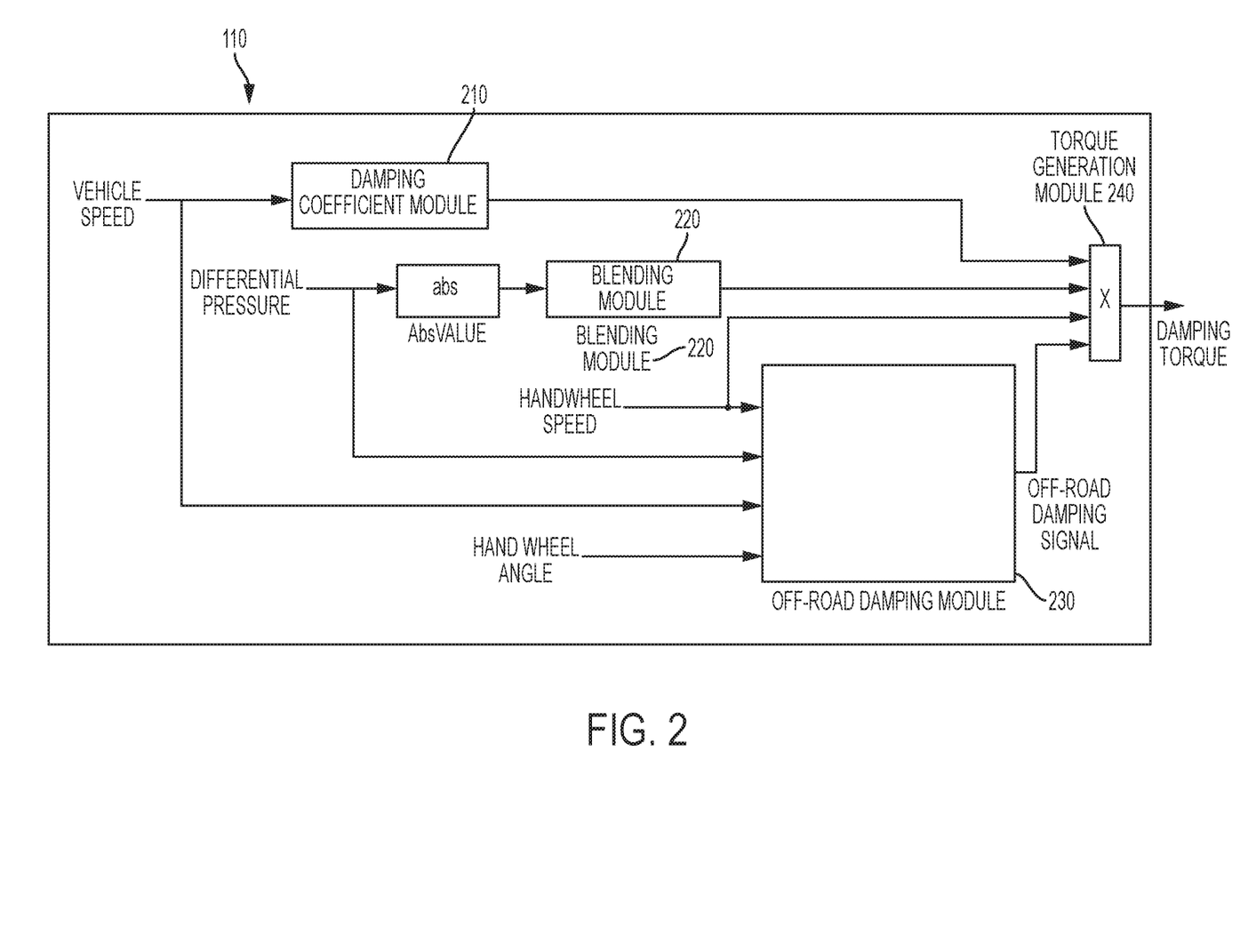
FIG. 2 illustrates components of a MTO torque module.

FIG. 2 illustrates components of the MTO torque module 110 that facilitate providing a damping torque signal to the MTO steering system. The MTO torque module 110 implements the technical solutions described herein and facilitates detecting the unintended input from terrain, and providing the damping torque corresponding to the unintended input. Accordingly, alternatively or in addition to providing the damping torque for smoother driving conditions, as illustrated in FIG. 1, the MTO torque module 110 illustrated in FIG. 2 provides a damping torque signal based on the terrain.

For example, the MTO torque module 110 includes a damping coefficient module 210, a blending module 220, an off-road damping module 230, and a torque generation module 240, among other components. The input signals to the MTO torque module 110 include the vehicle speed signal, the handwheel speed signal, the handwheel angle signal, and the measurement of the differential pressure signal, among other signals.

The damping coefficient module 210 determines a damping coefficient based on the vehicle speed signal. In one or more examples, the damping coefficient module 210 uses a lookup table to determine the damping coefficient based on a value of the vehicle speed signal as an input. Further, the blending module 220 determines a blending coefficient based on the measurement of the differential pressure signal. For example, the blending module 220 uses a lookup table to provide the blending coefficient based on a value of the measurement of the differential pressure signal as input. In one or more examples, the blending module 220 uses an absolute value of the value of the measurement of the differential pressure signal as input. In one or more examples, the blending coefficient is a value within a range of 0 to 1. It is understood that other ranges may be used in other examples.

The torque generation module 240 receives the damping coefficient and the blending coefficient along with the handwheel speed signal. Typically, such as when the vehicle is operating in smoother conditions, the torque generation module 240 generates the damping torque based on the damping coefficient, the blending coefficient, and the handwheel speed signal. For example, the torque generation module 240 multiplies the values of the damping coefficient, the blending coefficient, and the handwheel speed signal to generate the damping torque.

The MTO torque module 110 activates the off-road damping module 230 in response to detecting the unintended terrain input(s). The off-road damping module 230 generates an off-road damping signal, which is provided to the torque generation module 240. In one or more examples, the torque generation module 240 scales the product of the values of the damping coefficient, the blending coefficient, and the handwheel speed signal using a value of the off-road damping signal to generate the damping torque. For example, the off-road damping signal ranges in value from 0 to 1, depending on whether specified off road conditions are met. It is understood that other ranges may be used in other examples.

Figure 3:
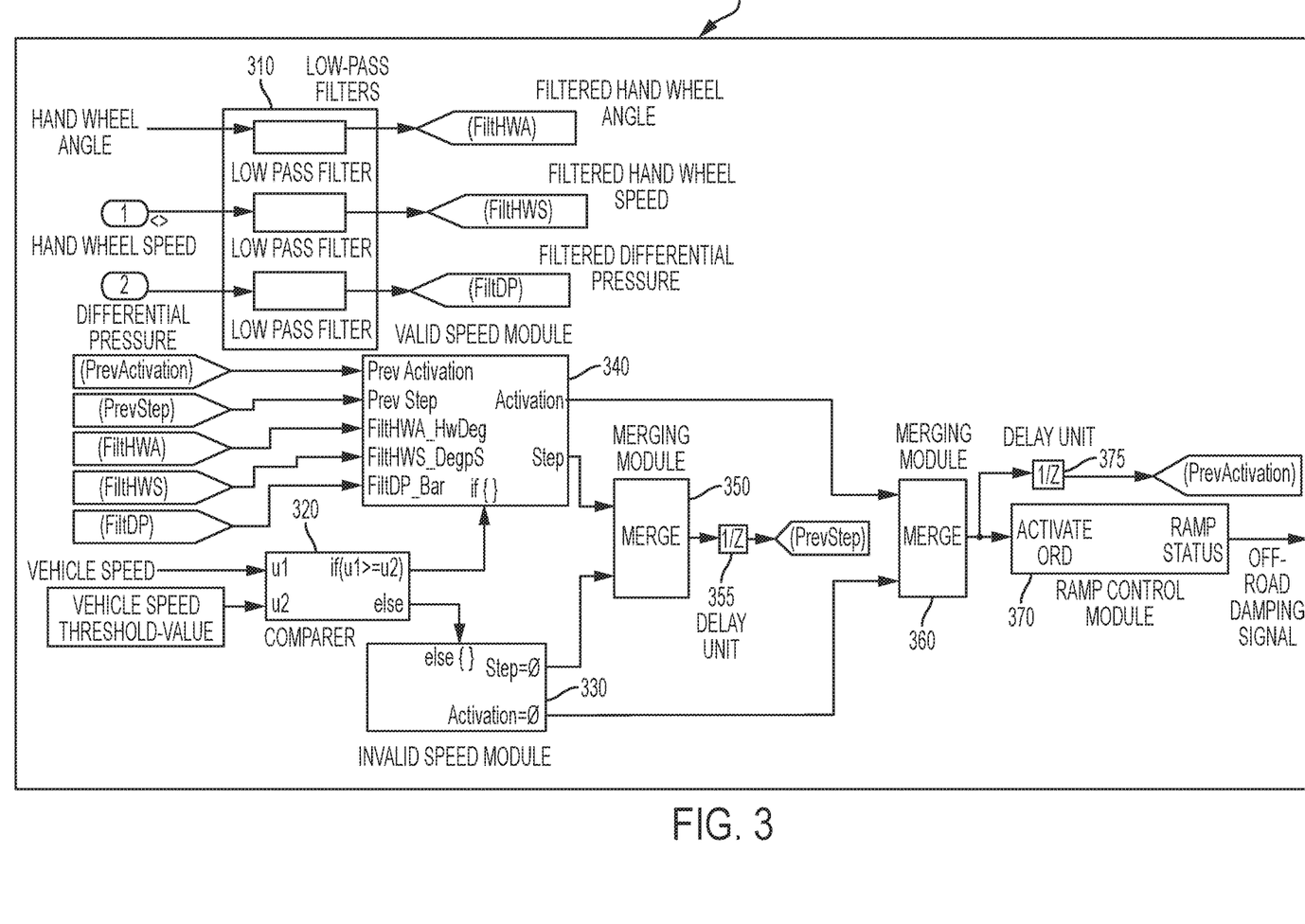
FIG. 3 shows a block diagram of example components of an off-road damping module.

FIG. 3 shows a block diagram of example components of the off-road damping module 230. The inputs to the off-road damping module 230 include the handwheel speed signal, the measurement of the differential pressure signal, the vehicle speed signal, and the handwheel angle signal. The off-road damping module 230 generates the off-road damping signal based on the inputs. In one or more examples, the off-road damping module 230 receives additional signals to refine detection of the off-road condition. The off-road damping module 230 includes a set of low-pass filters 310, a comparer 320, an invalid speed module 330, a valid speed module 340, a first merging module 350, a first delay unit 355, a second merging unit 360, a ramp control module 370, and a second delay unit 375, among other components.

In one or more examples, the set of low-pass filters 310 receives each of the handwheel angle signal, the handwheel velocity signal, and the differential pressure signal. The set of low-pass filters 310 correspondingly outputs a filtered handwheel angle signal, a filtered handwheel speed signal, and a filtered differential pressure signal. The filtered signals are used to generate the off-road damping signal.

The off-road damping signal is based on whether the vehicle is in a stationary state or a moving state. The off-road damping module 230 detects if the vehicle is stationary based on the vehicle speed signal. In a stationary vehicle, the MTO steering system does not receive the unintended input from the terrain, and hence, returning forces are non-existent. In other words, the vehicle has to be moving at least at a predetermined level of vehicle speed for the MTO steering system to receive the unintended input from the terrain. Accordingly, the comparer 320 compares the vehicle speed signal to a predetermined vehicle speed threshold-value. If the vehicle speed signal is below the vehicle speed threshold-value, the comparer 320 activates the invalid speed module 330, else activates the valid speed module 340.

The invalid speed module 330 sets both, a step value and an activation value to zero. The invalid speed module 330 forwards the step value (set to zero in this case) to the first merging module 350. Further, the invalid speed module 330 forwards the activation value (set to zero in this case) to the second merging module 360.

Alternatively, when the vehicle speed signal is at or above the vehicle speed threshold-value, the valid speed module 340 determines the value of the step value and the activation value. In one or more examples, the step value ranges from 0 to 1, and the activation value has a value of 0 or 1. It is understood that different range or different values may be used in other examples. In one or more examples, when the step value drops below a predetermined value (for example, 0.001), the valid speed module 340 sets the activation value to 0 (zero). Further, when the step value is above a second predetermined value (for example, 0.999), the valid speed module 340 sets the activation value to 1. The valid speed module 340 forwards the step value to the first merging module 350, and forwards the activation value to the second merging module 360.

The second merging module 360 at each iteration, receives the activation value from either the invalid speed module 330 or the valid speed module 340. The second merging module 360 outputs the last calculated value from the two inputs. If the invalid speed module 330 runs, the second merging module 360 outputs the activation value from the invalid speed module 330; if the valid speed module 340 runs, the second merging module 360 outputs the activation value calculated by the valid speed module 340. The second merging module 360 outputs the activation value, to the ramp control module 370, which in response ramps the damping signal value from a previous value to the new value of the activation value at a predetermined calibrated rate. Thus, the ramp control module 370 transitions the damping signal value according to the predetermined calibrated rate between the conditions when off-road damping module 230 is active and when off-road damping module 230 is not active. For example, if the off-road damping signal transitions within a predetermined range (such as 0 to 1), the predetermined calibrated rate transitions the off-road damping signal from one extreme of the predetermined range (for example, 0 or 1) to the other extreme (for example, 1 or 0) at the predetermined calibrated rate. For example, the predetermined calibrated rate facilitates the transition to occur at a rate such as 50 per second. The predetermined calibrated rate ensures safety and/or comfort of the driver of the vehicle, because a rapid change in the off-road damping signal may cause the MTO steering system to provide extra counteracting torque in response to the inputs from the terrain. The output from the ramp control module 370 is forwarded as the off-road damping signal to the torque generation module 240 (FIG. 2).

The first merging module 350 receives the step value from either the invalid speed module 330 or the valid speed module 340. The first merging module 350 outputs the last calculated value of the two inputs. If the invalid speed module 330 runs, the first merging module 350 outputs the step value of the invalid speed module 330; if the valid speed module 340 runs, the first merging module 350 outputs the step value calculated by the valid speed module 340. The first delay unit 355 and the second delay unit 375 delay the step value and the activation value respectively for a feedback loop into the valid speed module 340. In one or more examples, the first delay unit 355 and the second delay unit 375 are unit delays. Accordingly, the valid speed module 340 receives a previous step value and a previous activation value as inputs.

For example, the off-road damping module 230 calculates an incremental change to the step value. The incremental change is then added to the previous step value. When the step value is less than or equal to a predetermined minimum-value (for example, 0.001) the activation value is set to 0. When the step value is greater than or equal to a predetermined maximum-value (for example, 0.999) the activation value is set to 1. When the step value is between the two values (0.001<step value<0.999) the activation value is equal to the previous activation value.

Figure 4:
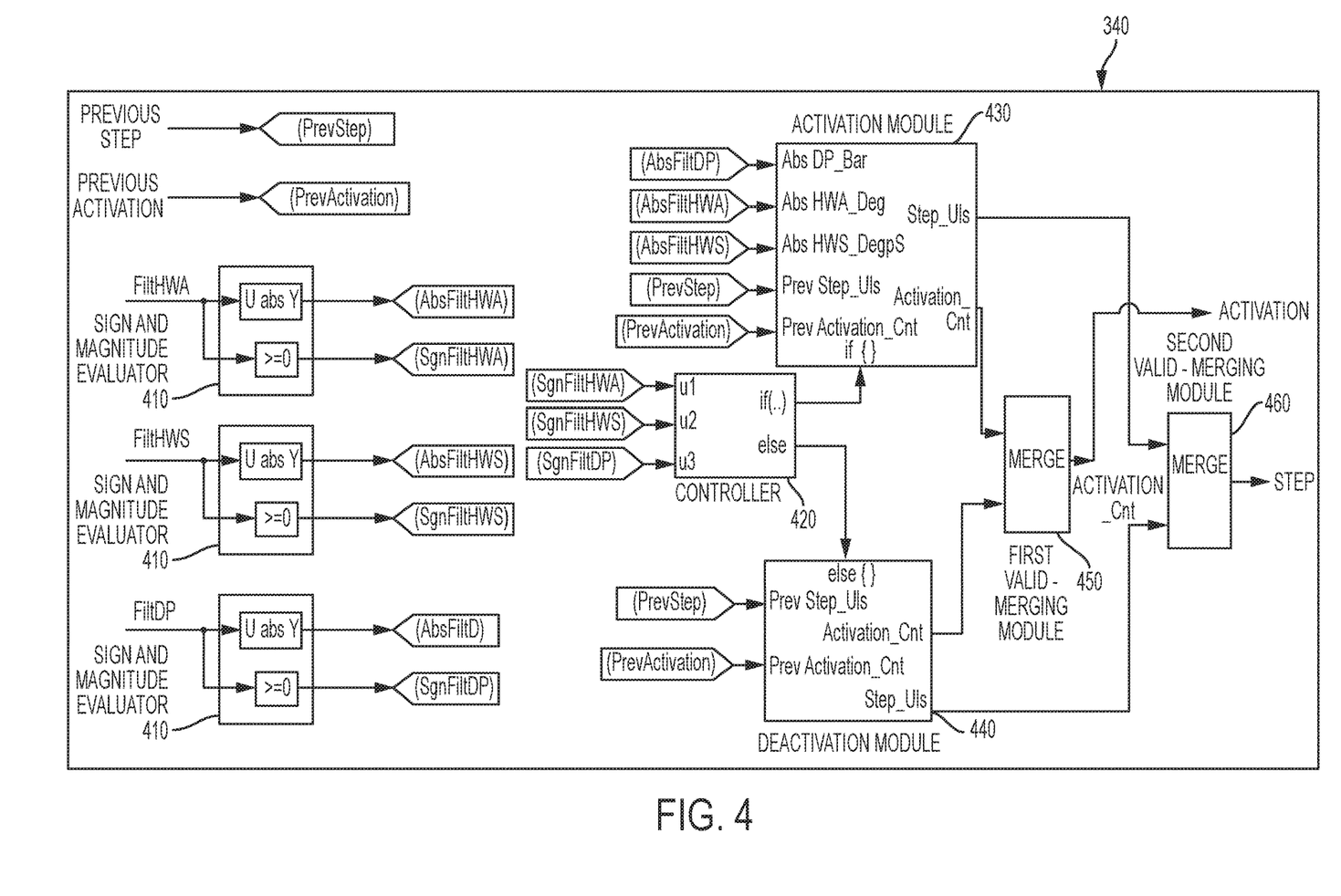
FIG. 4 shows example components of a valid vehicle speed module.

FIG. 4 shows example components of the valid vehicle speed module 340. The valid speed module 340 controls the step value and the activation value when the vehicle speed is at or above the predetermined vehicle speed threshold-value that is indicative of the vehicle being in motion, and thus susceptible to inputs from the terrain. The valid vehicle speed module 340 includes, among other components, one or more sign and magnitude evaluators 410, a controller 420, an activation module 430, a deactivation module 440, a first valid-merging module 450, and a second valid-merging module 460.

The sign and magnitude evaluators 410 evaluate each of the filtered handwheel angle value, the handwheel speed value, and the differential pressure signal value for respective magnitudes and signs. For example, a magnitude is indicative of an absolute value; and the sign is indicative whether the value is lesser than 0 (zero). The controller 420 uses the sign values to determine whether to activate or deactivate the off-road damping. For example, when the sign of the handwheel angle value and the sign of the handwheel speed value are the same, the controller 420 determines that the steering wheel is moving away from center, and that when the signs are different, the steering wheel is moving towards the center.

Further, when the steering wheel is moving away from the center, that is signs of the handwheel speed and handwheel angle are the same, and the sign of the differential pressure signal value is opposite of the former, the controller 420 determines that the MTO steering system is back-driven. In this condition, the controller 420 uses the activation module 430 to incrementally increase the step value. In one or more examples, the activation module 430 incrementally increases the step value based on the magnitude of the filtered handwheel angle value, the handwheel speed value, and the differential pressure signal value. As described herein, when the step value goes above a predetermined value (for example, 0.999), the activation value changes to 1, which activates the off-road damping signal.

Alternatively, when the MTO steering system is not being back driven, the step value is decreased by a predetermined amount, for each time step in which the MTO steering system is not being back driven. As described herein, when the step value drops below a predetermined value (such as 0.001), the activation value changes to 0. Thus, the off-road damping signal is deactivated when the back driving force is not present for a given period of time.

The first valid-merging module 450 and the second valid-merging module 460 respectively receive the activation value and the step value output by either the activation module 430 or the deactivation module 440 during an iteration. Each merging module outputs the last calculated value of the two inputs. For example, if the deactivation module 430 runs, the merging modules output the step or activation value of the deactivation module 430; if the activation module 440 runs, the merging modules output the step or activation value calculated by the activation module 440.

Figure 5:
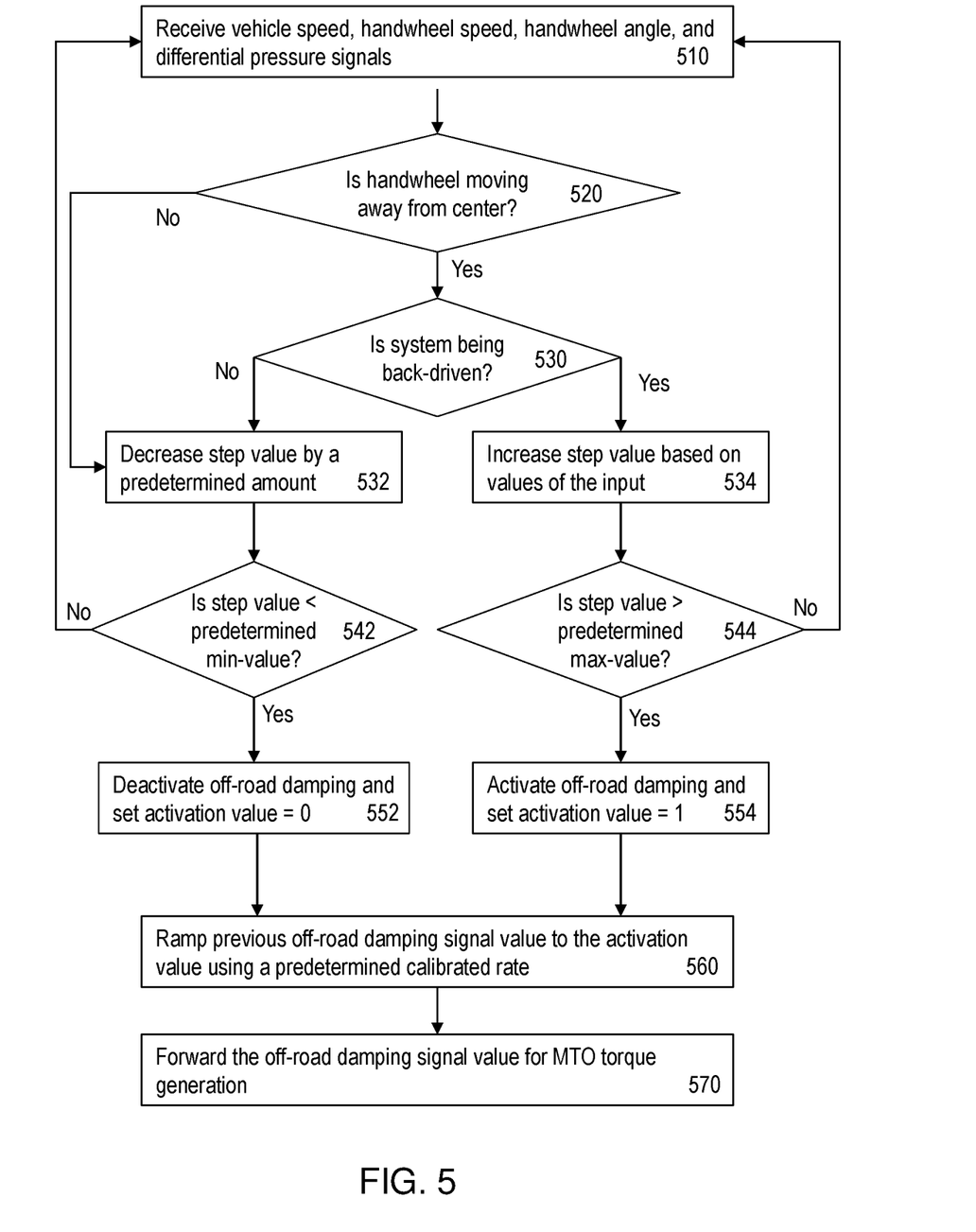
FIG. 5 shows a flowchart of an example method for providing off-road damping signal to a torque generation module of an MTO steering system.

FIG. 5 shows a flowchart of an example method that the off-road damping module 230 implements for providing the off-road damping signal to the torque generation module 240. The off-road damping module 230 receives as input, a vehicle speed signal, a handwheel speed signal, a handwheel angle signal, and a differential pressure signal, as shown at block 510. In one or more examples, the off-road damping module 230 checks if the vehicle is in motion by comparing the vehicle speed with a predetermined vehicle speed threshold-value. In case the vehicle is stationary, the off-road damping module 230 deactivates itself by outputting a step value of 0 and an activation value of 0.

If the vehicle is moving, the off-road damping module 230 checks if the steering wheel is moving away from the center, as shown at block 520. As described herein, the off-road damping module 230 determines if the wheel is moving away from the center based on the sign values of the handwheel speed and the handwheel angle. In case the handwheel is moving away from the center, the off-road damping module 230 determines whether the system is being back-driven, as shown at block 530. As described herein, in one or more examples, the off-road damping module 230 deems that the system is being back-driven if the sign of the differential pressure is different from a common sign shared by the handwheel speed and the handwheel angle.

If the system is not being back-driven, or if the handwheel is not moving away from the center, the off-road damping module 230 decrements the step value by a predetermined amount, as shown at block 532. In one or more examples, the off-road damping module 230 ensures that the step value does not go below a minimum range-value (for example, 0). Further, the off-road damping module 230 checks if the step value has been decremented to a value less than a predetermined minimum threshold-value (for example, 0.001), as shown at block 542. If the step value is above the predetermined minimum threshold-value, the off-road damping module 230 continues to operate in the loop based on the next inputs. Alternatively, if the step value crosses the predetermined minimum threshold-value, the off-road damping module 230 deactivates the off-road damping and sets the activation value to 0 (or any other value representative of the deactivated state), as shown at block 552.

Alternatively, if the system is being back-driven (block 530), the off-road damping module 230 increments the step value, as shown at block 534. In one or more examples, the step value increments by a predetermined amount. Alternatively, in one or more examples, the off-road damping module 230 computes the increment amount based on the inputs. In one or more examples, the increment value is based on a look up table and the magnitude of each signal. Alternatively or in addition, the increment value may be the smallest of the values from the input signal values. The off-road damping module 230 determines whether the step value crosses a predetermined maximum threshold-value (for example, 0.999), as shown at block 544. If the step value is below the predetermined maximum threshold-value, the off-road damping module 230 continues to operate in the loop based on the next inputs. Alternatively, if the step value crosses the predetermined maximum threshold-value, the off-road damping module 230 activates the off-road damping and sets the activation value to 1 (or any other value representative of the activated state), as shown at block 554.

The ramp control module 370 of the off-road damping module 230 detects if the activation value has changed (for example, from 0 to 1 or vice-versa). In response to a change in the activation value, the ramp control module 370 ramps a previous off-road damping signal value to the activation value using a predetermined calibrated rate, as shown at block 560. For example, consider an example scenario where the previous off-road damping signal value is 0.5 and the activation value is set to 1 (activation state). If the predetermined calibrated rate is 0.1 per microsecond, the off-road damping signal is ramped to reach 1 at that rate. Alternatively, if the activation value is set to 0 (that is deactivation case), the off-road damping signal is ramped to reach 0 at the predetermined calibrated rate. The off-road damping module 230 forwards the off-road damping signal value for MTO torque generation, as shown at block 570.

The method described above facilitates a high level of damping to be applied in an off-road condition, when unintended terrain input is detected, and a lower level of damping to be applied for smooth road conditions, in order to achieve desired steering feel, using an MTO steering system. The MTO steering system implementing technical solutions described herein prevents driver fatigue without using a shock absorber (or any other damper), which would create additional expense. Additionally, the technical solutions described herein facilitate the MTO steering system to provide multiple damping levels based on the predetermined calibrated rate. Conventional techniques such as using a shock absorber fail to provide such multiple damping levels.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A method for generating a damping torque in a magnetic torque overlay (MTO) based steering system, the method comprising:
   generating a damping torque based on a vehicle speed value, a handwheel velocity value, and a differential pressure value; and
   detecting an off-road condition, and in response:
   computing an off-road damping torque signal based on one or more of the vehicle speed value, the handwheel velocity value, the differential pressure value, and a handwheel angle value, wherein computing the off-road damping signal comprises:
   setting an activation value; and
   ramping a value of the off-road damping signal to the activation value according to a predetermined rate; and
   scaling the damping torque by multiplying the damping torque by the off-road damping torque signal.

2. The method of claim 1, wherein the off-road condition is detected based on the vehicle speed value being within a predetermined range.

3. The method of claim 1, wherein the setting the activation value comprises:
   computing a step value; and
   in response to the step value being below a predetermined minimum-value, setting the activation value to a first value, and in response to the step value being above a predetermined maximum-value, setting the activation value to a second value.

4. The method of claim 3, wherein computing the step value comprises:
   increasing the step value in response to the steering system being back-driven; and
   decreasing the step value in response to the steering system not being back-driven.

5. A torque module of a steering system, the torque module configured to:
   generate a damping torque based on a vehicle speed value, a handwheel velocity value, and a differential pressure value; and
   detect an off-road condition, and in response:
   compute an off-road damping torque signal based on one or more of the vehicle speed value, the handwheel velocity value, the differential pressure value, and a handwheel angle value, wherein computing the off-road damping signal comprises:
   setting an activation value; and
   ramping a value of the off-road damping signal to the activation value according to a predetermined rate; and
   scale the damping torque by multiplying the damping torque by the off-road damping torque signal.

6. The torque module of claim 5, wherein the off-road condition is detected based on the vehicle speed value being within a predetermined range.

* * * * *